United States Patent [19]
Takagi et al.

[11] 3,799,001
[45] Mar. 26, 1974

[54] CONTROL SYSTEM FOR AN AUTOMOTIVE AUTOMATIC POWER TRANSMISSION

[75] Inventors: Takeshi Takagi; Wataru Ishimaru; Toshiyuki Miyauchi, all of Yokohoma, Japan

[73] Assignee: Nissan Motor Company, Limited, Yokohama, Japan

[22] Filed: Dec. 7, 1972

[21] Appl. No.: 312,914

[30] Foreign Application Priority Data
Dec. 8, 1971  Japan.................. 46-99327

[52] U.S. Cl.................... 74/731, 74/752 A
[51] Int. Cl............... B60k 21/00, F16h 47/06
[58] Field of Search............. 74/731, 752 A, 752 D

[56] References Cited
UNITED STATES PATENTS
3,416,393  12/1968  Hattori................................. 74/731
3,640,156  2/1972  Mori et al........................ 74/731 X
3,670,598  6/1972  Mohri et al...................... 74/731 X Primary Examiner—Benjamin W. Wyche
Assistant Examiner—J. Reep

[57] ABSTRACT

A control system for controlling line pressure in a hydraulic control circuit of an automotive automatic power transmission driven from an engine through a hydrodynamic torque converter in which a line pressure regulator valve cooperates with an amplifier valve adapted to be controlled by a pressure signal produced by a fluid jet nozzle and an electronic actuating device associated therewith. The electronic actuating device is responsive to a voltage signal indicative of an output torque of the engine and a torque of the stator of the hydrodynamic torque converter for varying the pressure signal in dependence thereon so that the line pressure is regulated by parameters of the output torque of the engine and the torque of the stator of the hydrodynamic torque converter.

4 Claims, 14 Drawing Figures

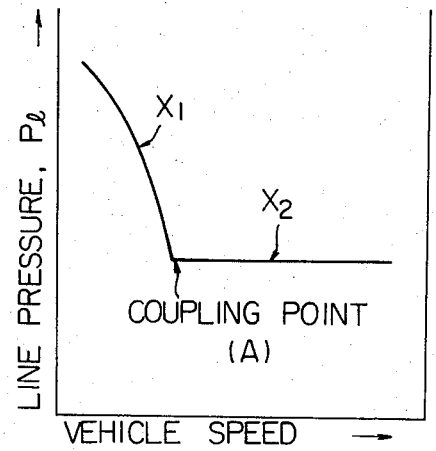
Fig. 5
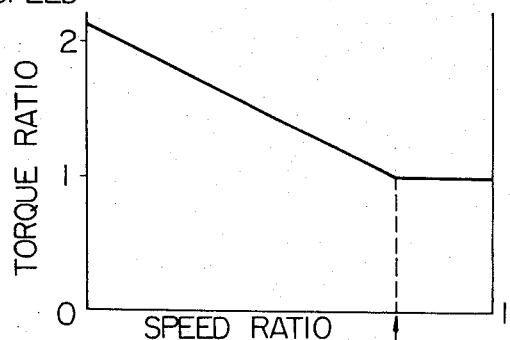
Fig. 6
Fig. 7
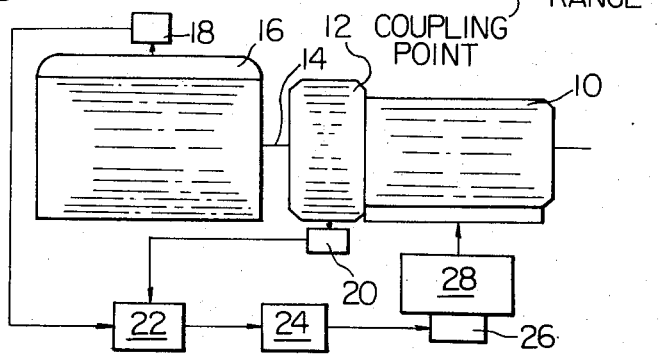

CONTROL SYSTEM FOR AN AUTOMOTIVE AUTOMATIC POWER TRANSMISSION

This invention relates in general to control systems for automotive automatic power transmissions and, more particularly, to a control system for an automotive automatic power transmission of the type driven from an engine through a hydrodynamic torque converter which control system is adapted to control the level of line pressure for hydraulically actuating friction elements, such as friction clutches and brakes of the power transmission.

An automatic power transmission used in a motor vehicle commonly includes a hydraulic control circuit for controlling friction elements, such as friction clutches and brakes, to selectively provide a plurality of different gear ratios. To effect smooth shifting between the gear ratios, it is desirable to change a torque capacity of the friction elements in accordance with the variations in engine loads. The required torque capacity increases as the engine load increases so that it must be relatively great at starting or during low speed driving and relatively small during high speed driving.

If the torque capacity of such a friction element is too small as compared to the required torque capacity at a given time, the slippage between the members to be coupled to each other will be too high, resulting in an inaccurate operation or racing of the engine. If, in contrast, the torque capacity of the friction element is too large, the clutch or brake will engage instantaneously and thus an objectionable shock will take place. Since the torque capacity of the friction element depends on the level of a hydraulic pressure used in the hydraulic control circuit, smooth engagement of the friction elements can be accomplished by controlling the level of the hydraulic pressure so as to minimize the difference between the torque capacity of the friction element and the required torque to be transmitted. The hydraulic pressure is hereinafter referred to as a line pressure.

In the known hydraulic control circuit, the cutback of the line pressure is effected by hydraulically producing the cutback signal by the use of a certain suitable means, such as hydraulic shift valves. The use of shift valves for this purpose, however, is not fully acceptable because of their limited responsiveness and inability of effecting smooth shiftings between the gear ratios particularly where the power transmission is controlled automatically. Another expedient proposed for the known hydraulic control circuit is to employ a fluid pressure operated governor valve in combination with a modulator valve which are arranged to control the level of the line pressure in accordance with the variations in vehicle speed as will be clearly explained hereinafter. Thus, the level of the line pressure can not be varied to follow the engine load and, therefore, it is quite difficult to effect smooth shiftings between the gear ratios.

It is, therefore, an object of the present invention to provide a novel and improved hydraulic pressure control system for an automotive automatic power transmission of the above-specified type.

Another object of the present invention is to provide a hydraulic pressure control system which is adapted to control the level of the line pressure for actuating friction elements of an automotive automatic power transmission of the above-specified type so as to provide smooth shifting between a plurality of different gear ratios.

Another object of the present invention is to provide a hydraulic pressure control system for an automotive automatic power transmission of the above-specified type, which control system is arranged to control the level of the line pressure for actuating friction elements of the power transmission in dependence on the variations in engine loads.

Still another object of the present invention is to provide a hydraulic pressure control system for an automotive automatic power transmission driven through a hydrodynamic torque converter, which control system is adapted to control the level of the line pressure in a hydraulic control circuit of the power transmission as a combined function of impeller torque and stator torque of the hydrodynamic torque converter.

A further object of the present invention is to provide a control system for an automotive automatic power transmission of the above-specified type, which control system is simple in construction and economical to manufacture.

These and other features and advantages of the present invention will become more apparent from the following description when taken in conjunction with the accompanying drawings in which:

FIG. 5 is a graph illustrating the relationship between the vehicle speed and the level of the line pressure which is achieved by the control system embodying the present invention;

FIG. 6 is a graph showing the relationship between the torque ratio and the speed ratio of the hydrodynamic torque converter driving a common automatic power transmission;

FIG. 7 is a schematic view of a control system according to the present invention;

Figure 1:
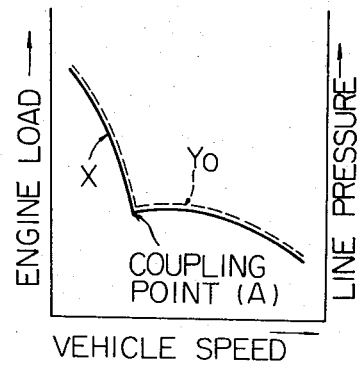
FIG. 1 is a graphical representation showing the variations of the engine loads and ideal line pressure in terms of vehicle speed.
Figure 2:
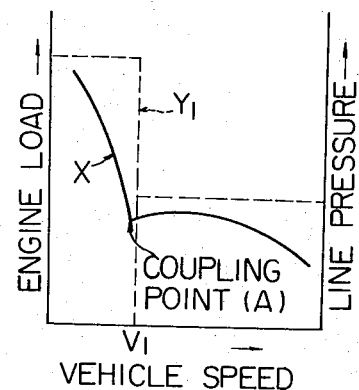
FIGS. 2 and 3 are graphical representations showing the variations in the line pressures which are attained in the known hydraulic control circuits.
Figure 3:
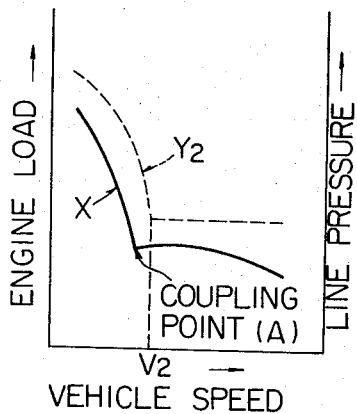

In a motor vehicle incorporating therein an automatic power transmission combined with a hydrodynamic torque converter, the engine load varies in such a manner as shown by a solid line X in FIG. 1. More specifically, the engine load sharply decreases until the vehicle speed reaches a predetermined value which corresponds to a coupling point A of the hydrodynamic torque converter and, thereafter, gradually decreases as the vehicle speed increases. In order to effect smooth shifting between a plurality of gear ratios, it is desired that the line pressure be varied in such a manner as shown by a broken line $Y_0$ in FIG. 1 because of the previously mentioned reason. It is, however, quite difficult to control the level of the line pressure so as to follow the broken line $Y_0$ shown in FIG. 1. It has thus heretofore been proposed to control the level of the line pressure as indicated by a broken line $Y_1$ in FIG. 2. To this end, a hydraulic control circuit of the power transmission is provided with a cutback valve which is so constructed as to produce a pressure signal, when the vehicle speed reaches a predetermined value indicated at $V_1$, which is applied to a regulator valve of the hydraulic control circuit whereby a cutback is effected in the line pressure. Another attempt which has heretofore been made is to employ a modulator valve which is combined with a fluid pressure operated governor valve adapted to produce a pressure signal indicative of the vehicle speed. The modulator valve is so arranged as to produce a pressure signal which increases with the increase in the pressure signal indicative of the vehicle speed until the vehicle speed reaches a predetermined value represented at $V_2$ in FIG. 3 and to produce a constant pressure signal after the vehicle speed exceeds the predetermined value $V_2$. The pressure signals thus produced by the modulator valve are then supplied to the regulator valve so that the line pressure is modulated in a manner as shown by a broken line $Y_2$ in FIG. 3. In these prior art devices, since the line pressure is controlled in accordance with the vehicle speed irrespective of the engine load it is difficult to obtain a line pressure which follows approximately the engine load and, accordingly, the line pressure is maintained at a higher value then the required line pressure whereby the friction elements are caused to engage instantaneously resulting in a shifting shock. Since, moreover, the prior art devices produce a line pressure which is higher than the required value due to their inherent constructions, an excessive magnitude of energy is required to be transmitted from an internal combustion engine mounted on the motor vehicle to an oil pump so that the performance efficiency of the engine is affected thus resulting in an increased fuel consumption.

The present invention contemplates to eliminate these drawbacks encountered in the prior art devices and to control the level of the line pressure at an optimum value in dependance on the variations in the driving force of the motor vehicle for providing smooth engagement of the friction elements of the power transmission thereby to effect smooth shifting between a plurality of gear ratios.

Figure 4:
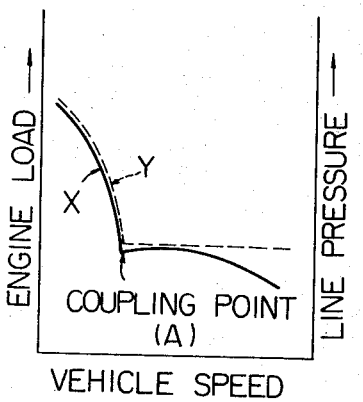
FIG. 4 is a graphical representation of the variations in the line pressure which is attained by the control system according to the present invention.

According to the present invention, the line pressure is controlled by two parameters: a torque of the stator of the hydrodynamic torque converter and an output torque of the internal combustion engine. These parameters are converted into respective voltage signals which are supplied to the control system according to the present invention as will be hereinafter described in detail so that the line pressure is modulated so as to follow a broken line Y shown in FIG. 4.

A control system embodying the present invention is schematically illustrated in FIG. 7, the control system being shown as incorporated in a common automatic power transmission of the type driven through a hydrodynamic torque converter. The automatic power transmission, which is generally designated by reference numeral 10, is arranged to be driven by the hydrodynamic torque converter which is generally indicated at 12. An example of the automatic power transmission is clearly shown and described in a U.S. Pat. No. 3,640,156 entitled "Control system for automotive automatic transmission." The hydrodynamic torque converter 12 is connected through an engine output shaft 14 to an internal combustion engine 16 to receive an output torque therefrom.

As previously mentioned, the present invention features that the line pressure is controlled as dependent on the output torque of the internal combustion engine 16 and the torque created in the stator of the hydrodynamic torque converter 12. To this end, the control system of the present invention comprises an engine torque sensor 18 and a stator torque sensor 20. The engine output torque sensor 18 is connected to a suitable part (not shown) of the engine 16 for electrically detecting the output torque of the engine 16 and generating a voltage signal in dependence on the output torque of the engine. The engine torque is usually measured by, for example, detecting a vacuum in an intake manifold of the engine or the position of an engine carburetor throttle valve. The engine torque sensor is clearly disclosed in a U.S. Pat. No. 3,430,616 entitled "Fuel injection control system" or in a U.S. Pat. No. 3,448,640 entitled "Electrical control for automatic transmission" and, therefore, the detail description of the same is herein omitted. The stator torque sensor 20 is mounted on a stator (not shown) of the hydrodynamic torque converter 12 for detecting a torque created in the stator and generating a voltage signal in dependence on the stator torque. The voltage signals thus generated from the engine torque sensor 18 and the stator torque sensor 20 are transmitted to a summing circuit 22. The summing circuit 22 is so arranged as to generate an output voltage signal in accordance with the voltage signals delivered from the engine torque sensor 18 and the stator torque sensor 20. This output voltage signal is delivered through an amplifying circuit 24 to an electronic control device 26 cooperating with a hydraulic control circuit 28 adapted to control the flow of pressurized fluid to the servo mechanisms (not shown) of the friction elements for thereby effecting a plurality of gear ratios. In response to the output voltage signal, the electronic control device 26 produces a pressure signal which is supplied to the hydraulic control circuit 28 so that the line pressure is controlled in accordance with the pressure signal in a manner as will be described hereinafter in detail.

Figure 8:
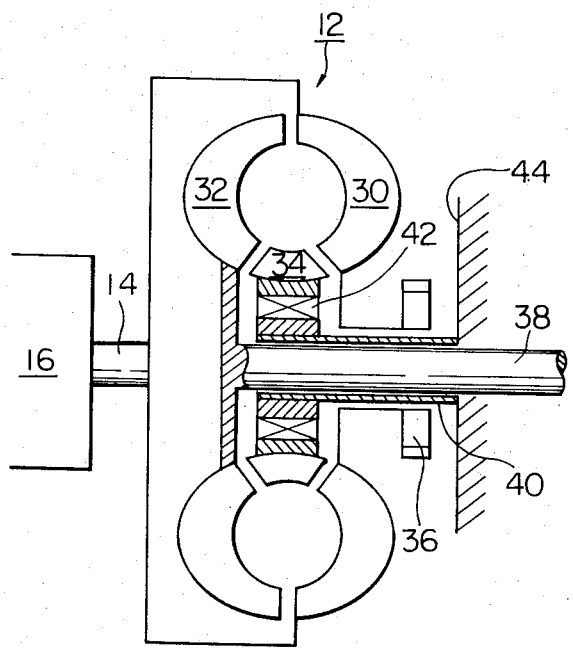
FIG. 8 is a cross sectional view of the hydrodynamic torque converter shown in FIG. 7.

FIG. 8 illustrates an example of the hydrodynamic torque converter 12 combined with the automatic power transmission 10 shown in FIG. 1. The hydrodynamic torque converter 12 comprises, as customary, a bladed impeller 30, a bladed turbine 32 and a bladed reaction element or stator 34. The impeller 30 is connected to the engine output shaft 14 so that the output torque of the engine 16 is transmitted through the engine output shaft 14 to the impeller 30. This impeller 30 is also connected to an oil pump 36 and operates the same, the oil pump 36 serving as a source of pressurized fluid as will be subsequently described. The turbine 32 is fixed to a turbine shaft 38 which serves as an input shaft of the power transmission. The stator 34 is rotatably mounted on a reaction shaft or hollow shaft 40 by means of a one-way clutch 42, the hollow shaft 40 being rigidly connected to a transmission casing 44.

The hydrodynamic torque converter 12 thus constructed operates in a manner well known for driving the turbine 32 at a higher torque than the torque impressed on the impeller 30 of the converter 12. The stator 34 functions to change the direction of flow of fluid from the turbine 32 to the impeller 30 so as to transfer this increased torque to the turbine 32. The stator tends to rotate in the same direction as the direction in which the turbine and impeller rotate when certain speeds of the last two parts are reached, whereupon the torque converter 12 functions simply as a fluid coupling in which the turbine 32 is driven at a substantially the same speed and without increase in torque with respect to the impeller 30. Performance characteristic of such a hydrodynamic torque converter is illustrated in FIG. 6, in which torque ratio (torque of the turbine shaft vs. torque of the engine output shaft) is plotted against speed ratio (revolution speed of the turbine vs. revolution speed of the engine output shaft). As seen in FIG. 6, the torque ratio varies in dependence on the variations in the speed ratio. More specifically, when the speed ratio is equal to zero, the torque ratio is approximately 2 and the torque ratio decreases as the speed ratio increases until the speed ratio reaches the coupling point. The torque ratio remains unchanged and is maintained at approximately 1 when the speed ratio increases beyond the coupling point as shown in FIG. 6. Thus, the range from zero to the coupling point of the speed ratio is usually named a conversion range and the range from the coupling point onward named a coupling range. It will thus be seen that the torque of the turbine shaft is larger than the torque of the engine output shaft because the torque ratio is larger than 1 within the converting range of the torque converter even when the torque of the engine output shaft is low and, therefore, the engine load curve X is bent at the coupling point as shown in FIGS. 1 to 4.

Assuming now that the torque of the impeller, that is, the torque of the engine output shaft is represented by $T_i$, the torque of the turbine, that is, the torque of the turbine shaft $T_t$, and the torque of the stator, that is, reaction torque of the torque converter $T_s$, then the following equation holds:

$$T_t = T_i + T_s$$

From this equation, it is seen that the increment in the turbine torque with respect to the impeller torque is equal to the torque of the stator. The present invention is based on this relation and proposes to control the level of the line pressure in accordance with the variations in the sum of the latter two factors so as to follow the curve Y shown in FIG. 4.

Figure 9:
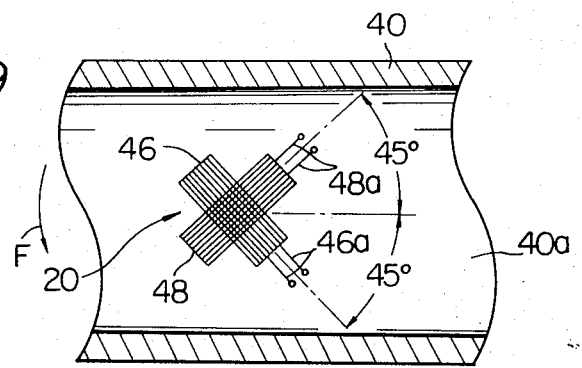
FIGS. 9 and 10 are views showing an example of the stator torque sensor shown in FIG. 7.
Figure 10:
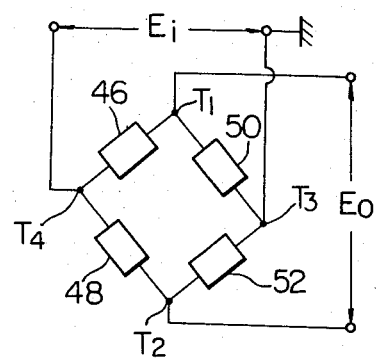

A preferred example of the stator torque sensor 20 forming part of the control system shown in FIG. 7 is illustrated in detail in FIGS. 9 and 10. In FIG. 9, the stator torque sensor 20 is shown as comprising two strain gages 46 and 48 which are affixed to an inner wall 40a of the reaction shaft 40 in such a manner as to form an angle of 45° with respect to the axis of the reaction shaft 40 and to meet at right angles with each other. Each of these strain gages may consist of a grid of strain-sensitive wire protected by a paper sheath as is well known in the art. The strain gages 46 and 48 have leads 46a and 48a, respectively, which are electrically connected to a bridge circuit shown in FIG. 10 for a purpose to be subsequently mentioned. It is to be noted that the reaction shaft 40 is connected at its left hand side to the stator of the torque converter and connected at its right hand side to the transmission casing.

Figure 11:
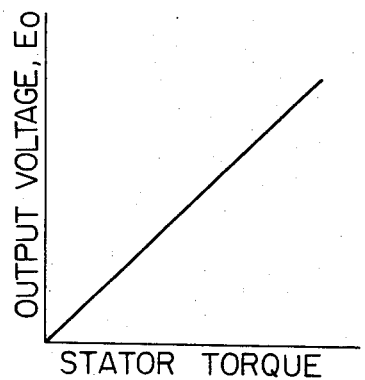
FIG. 11 is a graph showing an example of the relationship between the stator torque of the hydrodynamic torque converter and the output voltage which is developed by the stator torque sensor shown in FIGS. 9 and 10.

Assuming now that the reaction shaft 40 is twisted in the direction of an arrow F in FIG. 9, the strain gage 46 is subjected to a tension strain whereas the strain gage 48 is subjected to a compression strain. The amounts of these strains are absolutely equal to each other and are proportional to the torque of the stator. These strains in the reaction shaft 40 change the electrical resistances of the strain gages 46 and 48. Changes in the electrical resistances of the strain gages 46 and 48 are reflected by changes in voltage in a well-known bridge circuit shown in FIG. 10. The bridge circuit is herein shown as including in addition to the strain gages 46 and 48 fixed resistors 50 and 52. Now, let it be assumed that the resistance value of each resistor is R and that an input voltage $E_i$ is applied to the terminals $T_3$ and $T_4$, then the output voltage $E_0$ appearing at the terminals $T_1$ and $T_2$ is expressed as:

$$E_0 = ( \Delta R/2 ) E_i$$

where the symbol $\alpha R$ indicates the variations in the resistance values of the strain gages 46 and 48. $\Delta$ The value of $\Delta R$ is proportional to the reaction torque of the stator so that the output voltage of the bridge circuit is varied in proportion to the reaction torque of the stator of the hydrodynamic torque converter. This relation is exemplified in FIG. 11 wherein output voltage $E_0$ of the bridge circuit is plotted against the reaction torque of the stator of the hydrodynamic torque converter. As already described hereinabove, The output voltage $E_0$ representative of the stator reaction torque is delivered to the summing circuit, to which a voltage signal $E_{th}$ representative of the engine torque is also delivered. These two voltage signals $E_0$ and $E_{th}$ are utilized as functions for controlling the level of the line pressure as previously noted.

Figure 12:
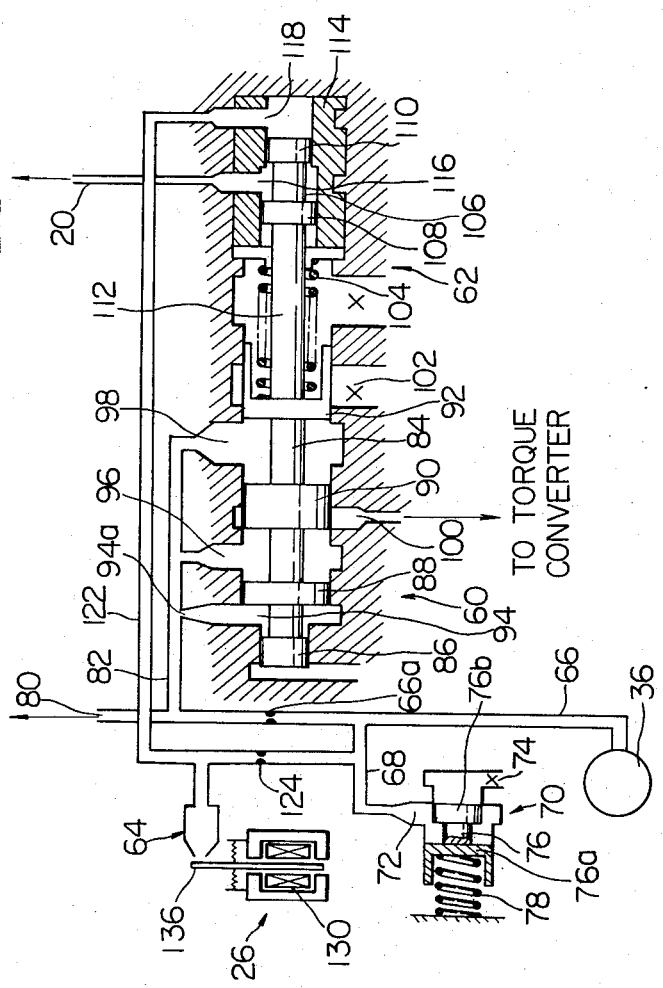
FIG. 12 is a schematic view illustrating an example of a hydraulic control circuit forming part of the control system shown in FIG. 7 and FIGS. 13 and 14 are enlarged views illustrating the servo valve shown in FIG. 12.

Referring next to FIG. 12, there is shown in detail a portion of the hydraulic control circuit 28 which forms a part of the control system shown in FIG. 7. As shown, the hydraulic control circuit 28 includes, in addition to the oil pump 36, a line pressure regulator valve 60, an amplifier valve 62 and a fluid jet nozzle 64 which is controlled by the electronic actuating device 26.

The oil pump 36, which may be of any suitable construction, serves as a source of fluid under pressure for supplying fluid under pressure to a main line pressure conduit 66 in which a flow restricting means 66a is disposed for restricting the flow of fluid under pressure passing therethrough. This main line pressure conduit 66 is hydraulically connected through a conduit 68 with a relief valve 70. The relief valve 70 has an inlet port 72 communicating through the conduit 68 with the main line pressure conduit 66 and an exhaust port 74. The relief valve 70 also has a valve spool 76 biased by a compression spring 78 for controlling fluid communication between the inlet port 72 and the exhaust port 74 so as to maintain the fluid pressure supplied from the oil pump 36 at a constant level. The valve spool 76 has spaced valve lands 76a and 76b of different diameters. The main line pressure conduit 66 is hydraulically connected through a conduit 80 to servo mechanisms (not shown) for actuating friction clutches and brakes to effect shifting between a plurality of gear ratios in the power transmission. The main line pressure conduit 66 is also hydraulically connected through a branch conduit 82 to the line pressure regulator valve 60.

The line pressure regulator valve 60 regulates the line pressure in the conduit 80 and includes a slidable valve spool 84 having a plurality of spaced valve lands 86, 88, 90 and 92. The regulator valve 60 has ports 94, 96, 98, 100 and 102. The port 94 communicates through a restrictor 94a with the branch conduit 82, with which the ports 96 and 98 also communicate. The port 100 communicates with the hydrodynamic torque converter (not shown) of the power transmission. The port 102 is a drain port through which excess fluid is drained off to reduce the line pressure. A compression spring 104 is provided for biasing the valve spool 84 leftwardly of the drawing. It will be appreciated that the degree of fluid communication between the ports 98 and 102 is controlled by the valve land 92 of the valve spool 84 whereby the line pressure is modulated to an appropriate level for effecting smooth engagement of the friction elements of the power transmission. As shown, the line pressure regulator valve 60 is operatively connected to the amplifier valve 62.

The amplifier valve 62 includes a slidable valve spool 106 having spaced valve lands 108 and 110. On the valve spool 106 is mounted a push rod 112 which cooperates with the valve land 92 of the line pressure regulator valve 60 to vary the fluid communication between the ports 98 and 102 for thereby modulating the line pressure to be delivered to the conduit 80. The valve spool 106 is slidably disposed in a sleeve 114 which has ports 116 and 118. The port 116 communicates with a conduit 120 which is hydraulically connected to a manual selector valve (not shown) of the hydraulic control circuit and to which a fluid pressure is supplied from the manual selector valve when it is set in its reverse drive position. The port 118 communicates with a conduit 122 which is hydraulically connected to the fluid jet nozzle 64, which in turn is hydraulically connected through a flow restricting means 124 to the conduit 68 communicating with the main line pressure conduit 66. With this arrangement, the fluid pressure transmitted from the oil pump 36 is supplied through the conduit 122 to the port 118 of the amplifier valve 62 and utilized to control the movements of the valve spool 106 thereby to control the degree of fluid communication between the ports 98 and 102. The fluid jet nozzle 64 is controlled by the electronic control device 26 as previously noted so that the pressure of the fluid to be supplied to the amplifier valve 62 is varied in dependence on the output torque of the engine and the torque of the stator of the hydrodynamic torque converter whereby the line pressure is regulated in accordance therewith.

Figure 13:
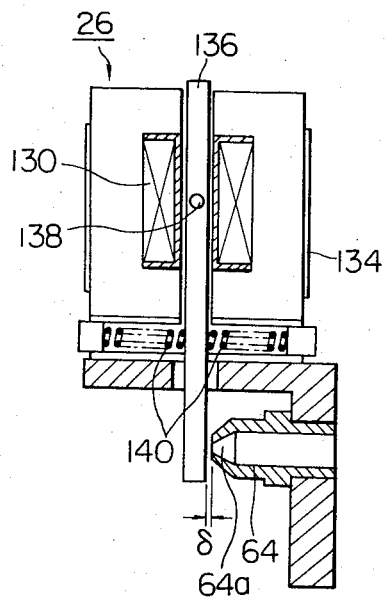
Figure 14:
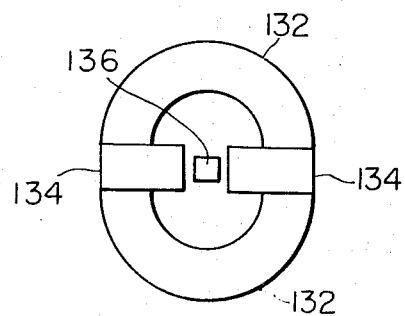

As best seen in FIGS. 13 and 14, the electronic control device may be a servo valve of the flapper type which comprises a coil 130, two semi-circular magnets 132 surrounding the coil 130, a pair of yokes 134 interposed between the two magnets 132, a flapper 136 intervening between the yokes 134 and pivotally mounted on a pin 138, and two compression springs 140 provided on opposite sides of the flapper 136 for supporting the same. As shown, the lower end of the flapper 136 is positioned in such a manner as to provide a gap δ between an opening end 64a of the fluid jet nozzle 64 and an opposing surface of the flapper 136 when the coil 130 is de-energized.

With this arrangement, as the voltage supplied to the coil 130 varies, the magnetic force varies thereby varying a force acting on the flapper 136. This force acting on the flapper 136 is proportional to the voltage supplied to the coil 130 and, therefore, the displacement of the flapper 136 or the gap δ between the fluid jet nozzle 64 and the flapper 136 is varied in accordance with the magnitude of the voltage supplied to the coil 130. As the gap δ varies, then the back pressure in the fluid jet nozzle 64 is caused to vary and accordingly the fluid pressure in the conduit 122 is varied. The control device 26 is designed to cause the flapper 136 to move to a position to reduce the gap δ between the flapper 136 and the fluid jet nozzle 64 with an increase in the voltage supplied to the coil 130, and the back pressure in the fluid nozzle 64 can be varied in proportion to the voltage supplied to the coil 130 of the control device 26.

As already mentioned hereinabove, the voltage supplied to the coil 130 of the control device 26 is dependent on the voltage signal $E_o$ indicative of the torque of the stator of the torque converter and the voltage signal $E_{th}$ indicative of the torque of the impeller of the torque converter which corresponds to the engine output torque. Consequently, if torque is created by the stator of the torque converter, then the coil of the control device 26 receives a voltage proportional to $E_o + E_{th}$ whereas, when no torque is produced by the stator of the torque converter, the voltage signal $E_o$ representative of the stator torque is zero so that the coil of the control device 26 receives a voltage signal proportional to the voltage signal $E_{th}$. It will thus be understood that the fluid pressure supplied through the conduit 122 to the amplifier valve 62 is varied in proportion to the value of voltage signals $E_o$ and $E_{th}$. This fluid pressure is represented by $P_i$. If, now, the fluid pressure $P_i$ is applied to the port 118 of the amplifier valve 62, the valve spool 106 is moved leftwardly as viewed in FIG. 12 to push the valve spool 84 of the line pressure regulator valve 60 with a force proportional to the fluid pressure $P_i$. Thus, the displacement of the valve spool 84 of the line pressure regulator valve 60 and accordingly the degree of fluid communication between the ports 98 and 102 are proportional to the fluid pressure $P_i$ supplied to the port 118 of the amplifier valve 62. Consequently, the fluid pressure acting on the different effective areas of the valve lands 86 and 88 of the regulator valve 60 is proportional to the fluid pressure $P_i$.

Assuming now that the difference ineffective areas between the valve lands 86 and 88 of the regulator valve 60 is represented by $S_1$ and the surface area of the valve land 110 of the amplifier valve 62 by $S_2$, then the fluid pressure, namely, the line pressure $P_l$ acting on the difference ineffective areas between the valve lands 86 and 88 of the regulator valve 60 is expressed as follows:

$$P_l = (S_2 / S_1) \cdot P_i$$

This relation is plotted in FIG. 5. As clearly seen in FIG. 5, the line pressure $P_l$ varies in a manner as shown by a curve $X_1$ when the vehicle speed is below the coupling point A of the torque converter. This is because of the fact that, when the torque converter is operating within its conversion range, a reaction force is produced by the stator of the torque converter due to its torque multiplication and the fluid pressure $P_l$ acting on the amplifier valve 62 (see FIG. 12) is proportional to the value of voltage signal $E_o$ plus voltage signal $E_{th}$. As the vehicle speed exceeds the coupling point A, the torque converter operates within its coupling range so that no reaction force is produced by the stator of the torque converter and, therefore, the fluid pressure $P_i$ is proportional to the value of the voltage signal $E_{th}$ indicative of the impeller torque or the engine output torque. Accordingly, the line pressure $P_l$ is varied in proportion to the engine output torque after the vehicle speed reaches the coupling point of the torque converter as shown by the curve $X_2$ in FIG. 5. It will thus be seen that the line pressure is varied in a manner as shown by the line X in FIG. 4.

It will now be appreciated from the foregoing description that the control system of the present invention is arranged to control the level of the line pressure in dependence on the impeller torque of the hydrodynamic torque converter or the engine output torque and the stator torque of the torque converter whereby the line pressure is modulated to an appropriate level for effecting smooth shifting between a plurality of gear ratios in the power transmission.

It will also be understood that the control system of the present invention is capable of reducing unnecessary power losses caused by the oil pump driven by the engine whereby an excessive fuel consumption of the engine is prevented.

It will further be noted that the control system of the present invention requires only a minimum number of component parts whereby the control system is simple in construction and economical to manufacture.

It should be noted that while the stator torque sensor forming a part of the control system of the present invention is herein shown and described as comprising a combination of a strain gage and a bridge circuit, the stator torque sensor may be constituted by piezoelectric elements.

It should also be born in mind that while the electronic actuating device of the control system embodying the present invention is shown and described as comprising a servo valve by way of example only, the servo valve may be replaced by another suitable means such as an electrically controlled solenoid valve.

What is claimed is:

1. A control system for controlling a line pressure in a hydraulic control circuit for an automatic power transmission driven from an engine through a hydrodynamic torque converter having a stator therein, said control system comprising: means for sensing an output torque of said engine and generating a voltage signal proportional thereto; means for sensing a torque of said stator of said hydrodynamic torque converter and generating a voltage signal proportional thereto; electronic control means electrically connected to said engine torque sensing means and said stator torque sensing means and responsive to said voltage signals; a source of fluid under pressure provided in said hydraulic control circuit; a line pressure regulator valve hydraulically connected to said source of fluid under pressure for regulating the line pressure; an amplifier valve operatively connected to said line pressure regulator valve and cooperating therewith for further regulating the line pressure; conduit means hydraulically connecting said amplifier valve to said source of fluid under pressure for supplying a pressure signal to said amplifier valve; said amplifier valve being responsive to said pressure signal for causing said line pressure regulator valve to regulate the line pressure in dependence on said pressure signal; and a fluid jet nozzle located in said conduit means and cooperating with said electronic control means for varying the level of said pressure signal in dependence on said voltage signals, whereby the line pressure is controlled by parameters of the output torque of said engine and the torque of the stator of said hydrodynamic torque converter.

2. A control system as claimed in claim 1, wherein said electronic actuating means comprises a servo valve including a coil electrically connected to said engine torque sensing means and said stator torque sensing means and energized by said voltage signals generated therefrom, and a flapper operated by said coil, said flapper opening and closing said fluid jet nozzle for varying the level of said pressure signal in said conduit means.

3. A control system as claimed in claim 1, wherein said line pressure regulator valve has a first port communicating through a restrictor with said source of fluid under pressure, a second port through which an excess of fluid is drained off to reduce the line pressure, and a slidable valve spool for controlling the degree of fluid communication between said first and second port thereby to control the level of the line pressure.

4. A control system as claimed in claim 3, wherein said amplifier valve has a port communicating with said conduit means hydraulically connected to said fluid jet nozzle, and a slidable valve spool moved by said pressure signal supplied to said port of said amplifier valve, said valve spool of said amplifier valve having a push rod cooperating with said valve spool of said line pressure regulator valve.

* * * * *